United States Patent [19]

Laity

[11] Patent Number: 5,441,689
[45] Date of Patent: Aug. 15, 1995

[54] PROCESS OF MAKING REGENERATED CELLULOSE ARTICLES

[75] Inventor: Peter R. Laity, Coventry, United Kingdom

[73] Assignee: Courtaulds PLC, London, United Kingdom

[21] Appl. No.: 240,696

[22] PCT Filed: Dec. 1, 1992

[86] PCT No.: PCT/GB92/02233
§ 371 Date: May 9, 1994
§ 102(e) Date: May 9, 1994

[87] PCT Pub. No.: WO93/11287
PCT Pub. Date: Jun. 10, 1993

[30] Foreign Application Priority Data
Dec. 2, 1991 [GB] United Kingdom ............... 9125594

[51] Int. Cl.⁶ .................. B01D 15/04; D01F 2/00; D01F 13/02

[52] U.S. Cl. ................... 264/179; 210/670; 210/681; 210/683; 210/687; 210/688; 264/187; 521/26

[58] Field of Search ............ 264/38, 179, 187, 203; 210/670, 681, 683, 687, 688; 521/26

[56] References Cited

PUBLICATIONS

English Translation of Japan 2-298,358 (Published Dec. 10, 1990).
Abstract of Japan 61-42,336 (Published Feb. 28, 1986).
Abstract of Japan 62-121,650 (Published Jun. 2, 1987).

*Primary Examiner*—Leo B. Tentoni
*Attorney, Agent, or Firm*—Howson and Howson

[57] ABSTRACT

Aqueous solutions of an amine N-oxide such as N-methyl morpholine N-oxide used in the manufacture of regenerated cellulose can be purified by passage through a strongly basic anion-exchange resin. The resin is regenerated by treatment with (1) an aqueous solution of a strong inorganic acid such as hydrochloric or sulphuric acid and (2) an aqueous solution of sodium hydroxide.

18 Claims, No Drawings

PROCESS OF MAKING REGENERATED CELLULOSE ARTICLES

The present invention relates to improved methods of purifying aqueous solutions of tertiary amine N-oxides, particularly spinning baths used in the manufacture of regenerated cellulose fibres and films.

Cellulose can be dissolved in certain tertiary amine N-oxides (hereinafter also referred to as amine oxides) to form a solution. Examples of such amine oxides include dimethylbenzylamine N-oxide, dimethylethanolamine N-oxide, dimethylcyclohexylamine N-oxide, and particularly N-methylmorpholine N-oxide (NMMO). The solutions so formed can be extruded through a die into an aqueous spinning bath to form regenerated cellulose articles in the form of fibres or films, depending on the shape of the die. Such processes are described in U.S. Pat. Nos. 3,447,939, 3,508,941 and 4,246,221, the contents of which are incorporated herein by way of reference.

The used or spent spinning bath must be purified and concentrated in order to recover and re-use the amine oxide it contains. If purification is not carried out, the recovered amine oxide and hence cellulose solutions made using it become progressively more discoloured as soluble coloured impurities accumulate in the system. Consequently, regenerated cellulose articles will be produced which are discoloured and thus of poor quality. Woodpulp used as a commercial source of cellulose contains a low level of non-cellulosic coloured impurities. Coloured impurities are also formed by degradation of organic compounds during the handling of solutions of cellulose in amine oxides at elevated temperatures.

The use of ion-exchange resins for colour removal from aqueous sugar juices is known, and is described for example in an article entitled "Ion Exchangers" in Ullmann's Encyclopaedia of Industrial Chemistry, fifth edition, Volume A14 (VCH Publishers, 1989) at page 393. The preferred resins are strongly basic resins used in the chloride form, which contain quaternary ammonium groups $-CH_2N(CH_3)_3{}^+Cl^-$, preferably the highly porous types of resin referred to as macroporous resins.

U.S. Pat No. 4,193,817 describes a process for the production of bottler's liquid brown sugar which involves passing remelted brown sugar over a strongly basic anion-exchange resin in the chloride form. The resin may be regenerated by treatment with an aqueous solution of hydrochloric acid, containing for example 3.5% w/w HCl, followed by treatment with an aqueous solution of sodium chloride and sodium hydroxide, containing for example 10% NaCl and 1% NaOH.

DD-A-254199 describes the purification of aqueous solutions of N-methylmorpholine N-oxide, especially those produced during the regeneration of polymers in the synthetic fibre and plastics industry. The solutions are passed through a column containing two separate styrene-divinylbenzene copolymer anion-exchange resins in successive stages. The resin used in the first stage is a weak anion-exchange resin carrying amino groups $-CH_2N(CH_3)_3$ and that used in the second stage is a strong anion-exchange resin carrying quaternary ammonium groups $-CH_2[N(CH_3)_3]^+OH^-$. The solution being purified, initially dark brown, is reported to be light brown or yellow after the first stage of treatment and to be light yellow or colourless after the second stage of treatment. The resins are activated by treatment with 3% w/w aqueous sodium hydroxide and are regenerated by treatment with an aqueous solution containing 3% w/w sodium hydroxide and 10% w/w sodium chloride.

EP-A-427701 describes the purification of aqueous solutions of N-methylmorpholine N-oxide, especially spinning bath solutions obtained during the manufacture of cellulosic products, by passage over an anion-exchange resin. The resin contains exclusively $-CH_2N^+(CH_3)_3X^-$ or $-CH_2N^+[(CH_3)_2(CH_2OH)]X^-$ groups, where $X^-$ is the anion of an inorganic or organic acid. The solution to be purified contains coloured degradation products of polyhydric phenols and their complexes with iron. The purified solution has a much reduced level of iron. The resin is regenerated by treatment with an aqueous acid solution. The acid is preferably a volatile organic acid, especially carbonic acid, formic acid or acetic acid. This allows the recovery of excess acid by distillation and the disposal of waste by incineration. Organic acids such as those named are, however, expensive in comparison with the inorganic substances commonly used to regenerate anion-exchange resins, for example brine or caustic soda.

A process according to the invention for the manufacture of regenerated cellulose articles including the steps of:

(a) dissolving cellulose in a tertiary amine N-oxide to form a solution;

(b) contacting the solution with an aqueous bath to precipitate regenerated cellulose and to form spent bath;

(c) purifying the spent bath by treatment with a strongly basic anion-exchange resin in hydroxide form is characterised in that the resin is regenerated by successive treatment with:

(1) an aqueous solution of a strong inorganic acid; and
(2) an aqueous solution of sodium hydroxide.

The regenerated cellulose articles may for example take the form of fibres, films or tubing. These may be produced by extruding the solution of cellulose in tertiary amine N-oxide through a suitable die into an aqueous bath, commonly called a spinning bath in fibre manufacture and a casting bath in film or tubing manufacture.

The strongly basic anion-exchange resin is preferably a quaternary ammonium resin containing $-CH_2N(CH_3)_3{}^+X^-$ groups, that is, the type known as a Type 1 resin. Type 2 resins, which contain $-CH_2N[(CH_3)_2(CH_2CH_2OH)]^+X^-$ groups, may also be used. The resin is said to be in the chloride form when $X^-$ is chloride ion $Cl^-$. After regeneration according to the process of the invention, $X^-$ represents hydroxyl ion $OH^-$, and the resin is said to be in the hydroxide form. The resin is preferably a macroporous resin. Examples of suitable resins are those listed in the Table on page 451 of the cited article in Ullmann's Encyclopaedia under the heading "Strong base anion resins—macroporous types", for example AMBERLITE IRA-900 (Amberlite is a trademark of Rohm and Haas Company) or Lewatit MP-500 (LEWATT is a trademark of Bayer AG).

Regeneration of the resin by treatment with a strong inorganic acid such as hydrochloric acid alone is not satisfactory. Although anion-exchange resin in the chloride form so produced is capable of decolorising spent bath, hydrogen chloride and chloride salts are liberated when spent bath is passed through the resin. This gives rise to the risk of corrosion of metals, including stainless steel, used in the construction of the rest of the plant. Both the presence of acid and the presence of chloride ions increase this risk. Regeneration of the resin by treatment with sodium hydroxide alone converts the resin into the hydroxide form which is capable of decolorising spent spinning bath. However, only a fraction of the coloured material retained by the resin is removed from the resin by this treatment. Therefore, after a few regeneration cycles the capacity of the resin for removing coloured material from spent bath is reduced to an unacceptably low level. The two-step regeneration method of the invention is unexpectedly considerably more effective than either single-step method. Considerable amounts of coloured material are removed during the hydrochloric acid treatment and the resin regenerated after the sodium hydroxide treatment is highly effective at decolorising further quantities of spent bath.

The strong inorganic acid used in the first stage of regeneration according to the solution is preferably hydrochloric acid, although sulphuric acid may also be used. Strong inorganic acids may be called mineral acids. Hydrochloric acid and sulphuric acid are strong inorganic acids which have a sole or first pKa of less than 0 in water at 25° C. The solution of the acid may contain 1 to 10 per cent by weight of the acid, preferably 2 to 7 per cent by weight. This solution may optionally contain in addition a salt of a strong acid, for example sodium chloride. Treatment with this solution converts the resin into the chloride form.

The solution used in the second stage of regeneration according to the invention may contain 1 to 10 per cent by weight sodium hydroxide, preferably 2 to 6 per cent by weight. Treatment with this solution converts the resin into the hydroxide form.

It may be preferred to use approximately stoichiometrically equivalent amounts of the strong inorganic acid and of sodium hydroxide or a small excess of sodium hydroxide over the strong inorganic acid in the two treatment stages. Preferably 1.0–1.1 mole sodium hydroxide is used for each equivalent of strong acid, because acidic impurities from the spent bath accumulate on the resins during the purification step and are removed from the resin during the treatment steps. The combined effluent from the treatment stages is by this means an approximately neutral solution of a sodium salt such as sodium chloride or sulphate which therefore presents minimal environmental problems on disposal.

The anion-exchange resin is typically contained as a bed in a column through which the spent bath to be purified is passed. The resin is preferably regenerated while the purified bath is still of high quality; that is, before the resin is exhausted, and before it becomes saturated with impurities. If regeneration is delayed too long, then the quality of the purified bath will deteriorate, and regeneration of the resin may be incomplete or unsatisfactory. The condition of the resin can be monitored by measuring the electrical conductivity of the purified bath, which rises when the resin is nearly exhausted. Alternatively, the condition of the resin can be monitored by colorimetry of the purified bath. Such measurements can form the basis of a method of automatic control, in which the column is taken off line and regenerated when the conductivity or degree of colour respectively has risen to a predetermined value.

Typically two or more columns will be installed in parallel, with the spent bath being purified by passage through one or more of them, and the remainder of them either undergoing the regeneration treatment or having been regenerated and being ready to be put on line when required.

The complete regeneration cycle involves water washes at various stages. The water used in these washes is preferably soft water of low mineral content, and may be demineralised water. The treatments with solutions of strong inorganic acid and of sodium hydroxide are normally performed as co-current washes, that is, with the same direction of flow as the spent bath. The water washes are commonly co-current washes, although one or more may be performed in the reverse direction in order to slurry and reform the bed and to remove solid debris entrapped on or in it. A typical cycle is as follows:

1. Take column off-line.
2. Allow residual bath to drain from the column.
3. Water-wash column.
4. Treat with the aqueous solution of strong inorganic acid.
5. Water-wash column.
6. Treat with the aqueous solution of sodium hydroxide.
7. Water-wash column.
8. Put column on-line or standby.

Typically, 2 to 10 bed volumes of water may be used for the water washes. A bed volume is the volume of liquid required completely to wet a drained, but not dry, bed of resin. Generally one or more bed volume of each of the treatment solutions is used; 1.0 to 5.0 or 1.5 to 3.0 bed volumes may be preferred. Alternatively, smaller volumes of the treatment solutions may be allowed to drain through the resin or forced through the resin by the succeeding water-wash. The optimum amount of each wash and of each solution is best determined empirically by experimentation on a column installed in a plant for the manufacture of regenerated cellulose articles, so that the minimum volume of each which results in satisfactory regeneration may be used. The first part of wash 3 is generally rich in amine oxide and may be recycled together with the drainings from step 2. A reverse direction (counter-current) water-wash may be performed between steps 3 and 4.

The method of the invention is preferably used to regenerate the resin in every regeneration cycle. It may, however, be found satisfactory to use the method less frequently, for example in alternate regeneration cycles or in one in four regeneration cycles. The intermediate regenerations can be performed in the conventional manner by treatment with an aqueous solution of sodium hydroxide; that is, with the omission of steps 4 and 5 in the regeneration cycle hereinbefore described.

It is generally found that fresh resin has a higher capacity for removal of coloured impurities than resin which has been submitted to several purification and regeneration cycles. When resin is regenerated according to the method of the invention, its capacity stabilises after a few cycles at a level somewhat below the capacity of the fresh resin. It can thereafter be submitted to several hundred or more cycles without significant reduction or with only slow reduction in capacity. The resin may have a useful life of two or more years.

Purification is preferably performed on the spent bath before it is concentrated for re-use. The spent bath generally contains 5–40%, more commonly 15–35%, by weight amine oxide. The amine oxide is preferably N-methylmorpholine-N-oxide.

It is generally also desirable to remove metal cations from the spent bath before recovery of the amine oxide. This can be conveniently done by passing the bath through a bed of a cation-exchange resin, for example a sulphonated resin. It may be advantageous additionally or alternatively to pass the bath through a chelating cation-exchange resin, for example an imino-diacetate resin. The spent bath generally contains monovalent cations such as sodium and polyvalent cations such as calcium, iron, manganese and copper. These may be derived either from the raw materials used in the manufacture of regenerated cellulose articles, in particular woodpulp, or from the materials of construction of the plant. The spent bath may be passed through such a bed of cation-exchange resin before or, preferably, after passage through the bed of anion-exchange resin. The anion-exchange resin removes a greater quantity of impurities from the spent bath than does the cation-exchange resin. The preferred arrangement therefore protects the cation-exchange resin against excessive fouling. In conventional water-treatment systems, it is usual to pass water firstly through a cation-exchange resin and secondly through an anion-exchange resin.

It is generally also desirable to remove suspended solid material from the spent bath before passage through ion-exchange resin, for example by filtration, which need only be a coarse filtration.

The invention is illustrated by the following Examples.

Cellulose was dissolved in NMMO and extruded into an aqueous spinning bath to produce regenerated cellulose filaments in the manner described in U.S. Pat. No. 4,261,943. The spent spinning bath so produced was used in these Examples.

The concentration of coloured impurities in aqueous amine oxide solution was measured spectrophotometrically at 450 nm using 10 mm path length against a distilled water control. The results were expressed in the form of the optical density of a solution containing 1% by weight amine oxide (AOOD).

EXAMPLE 1

1.0 g air-dry ion-exchange resin was placed in 100 ml spent spinning bath containing 20% by weight NMMO in water and having AOOD 0.06. This was more than sufficient to saturate the exchange sites on the resin. The colour remaining in the amine oxide solution after 1 hour was measured with the following results:

| Code | Type | Reduction in AOOD % |
| --- | --- | --- |
| XAD-2 | Non-ionic resin | 5 |
| XAD-4 | Non-ionic resin | 5 |
| IRA-93 | Weak base anionic resin | 7 |
| IRA-400 | Strong base anionic resin, gel type | 5 |
| IRA-401S | Strong base anionic resin, gel type | 9 |
| IRA-900 | Strong base anionic resin, macroreticular type | 10 |
| IRA-958 | Strong base anionic resin, macroreticular type | 6.5 |

All the resins used were AMBERLITE resins supplied by Rohm and Haas Company.

EXAMPLE 2

5 g AMBERLITE IRA-900 was placed in a 25 ml burette and saturated with coloured impurities by passage of spent spinning bath as used in Example 1 through it. The bed of resin was then soaked with either 10% aqueous NaOH or 10% aqueous HCl for 30 minutes, after which the liquor was drained off and its colour assessed. The soaking and draining treatment was repeated five times. The NaOH liquors removed very little colour. The resin had been regenerated to the hydroxide form, but retained most of the coloured impurities. In contrast, the first HCl liquors were highly coloured while the last liquors contained little colour. Most of the coloured impurities had been removed, and the resin in the chloride form could now be regenerated to the hydroxide form by treatment with aqueous NaOH.

EXAMPLE 3

AMBERLITE IRA-900 resin was saturated with coloured impurities as described in Example 2. The bed of resin was then soaked in aqueous HCl of various strengths for 10 minutes, after which the liquor was drained off and its optical density measured, with the following results:

| HCl % | O.D. |
| --- | --- |
| 0 | 0 |
| 1 | 0.40 |
| 2 | 0.45 |
| 5 | 0.46 |
| 10 | 0.65 |

EXAMPLE 4

AMBERLITE IRA-900 resin was saturated with coloured impurities as described in Example 2. It was then soaked 10 times with a single bed volume of 3.6% HCl, each soaking lasting for 30 minutes after which the liquor was drained off. The optical density of each of the 10 samples of drained liquor was then measured. Results were expressed as the percentage of the total amount of colour removed in all soakings.

| Bed volumes of HCl | Colour removed % | |
| --- | --- | --- |
| | per soaking | cumulative |
| 1 | 44 | 44 |
| 2 | 33 | 77 |
| 3 | 12 | 89 |
| 4 | 5 | 94 |
| 10 | — | 100 |

EXAMPLE 5

AMBERLITE IRA-900 resin was placed in a 25 ml burette to form a 10 ml bed and eluted with spent spinning bath containing 30% by weight NMMO in water and having AOOD 0.06 at a rate of 10 bed volumes/hour until 3 g NMMO had passed per 1 g resin. The optical density of the eluate was measured, and the point at which the AOOD of the eluate rose to 20% of the original value calculated. The resin was regenerated by passage of (1) 3 bed volumes 3.6% aqueous HCl, and (2) 2 bed volumes 5% aqueous NaOH. The high flow rate and a high degree of exhaustion were used in order to provide a severe test of the resin. The results of successive runs were as follows:

| Run number | g NMMO passed/ml resin when eluate AOOD = 20% of feed AOOD |
| --- | --- |
| 1 | 2.20 |
| 2 | 1.70 |
| 4 | 1.45 |
| 10 and subsequently | 1.25 |

Fresh resin was found to be more effective than regenerated resin. However, if the HCl wash was omitted, the capacity of the column in the sense of the results tabulated above rapidly fell towards zero.

EXAMPLE 6

A pilot plant for the manufacture of regenerated cellulose fibre was equipped with an ion exchange column for the purification of spent spinning bath. The column contained 100 l AMBERLITE IRA-900 strong anion exchange resin, the depth of the resin bed being about 750 mm. The plant was operated discontinuously over a period of more than 2 years, and was capable of producing 200 kg/day regenerated cellulose fibre. The spent spinning bath typically contained about 800 kg/day NMMO as a 20-25% solution in water. The AOOD of the spent spinning bath was in the range 0.015-0.035 before passage through the column and 0.004-0.005 afterwards. The AOOD of the purified bath remained constant until around 1500 kg NMMO had passed through the column, after which it began to rise, showing that the resin required regeneration. The resin was regenerated by the series of treatments shown in the following table:

| Liquor | Bed Volumes | Direction of Wash |
| --- | --- | --- |
| None (drain down) | — | — |
| Water | 2 | Forward |
| Water | 3 | Backward |
| 5% HCl | 1.5 | Forward |
| Water | 4.5 | Forward |
| 4% NaOH | 3 | Forward |
| Water | 9 | Forward |

After the initial commissioning period, the capacity of the column and the quality of the purified bath (as shown by its AOOD) remained steady. The original charge of resin was used throughout the whole period.

I claim:

1. A process for the manufacture of a regenerated cellulose article comprising the steps of:
   (a) dissolving cellulose in a tertiary amine N-oxide to form a solution;
   (b) contacting the solution with an aqueous bath to precipitate said regenerated cellulose article and to form spent bath;
   (c) purifying the spent bath by treatment with a strongly basic anion-exchange resin in hydroxide form,
   in which process the resin is regenerated by successive treatment with:
   (1) an aqueous solution of a strong inorganic acid; and
   (2) an aqueous solution of sodium hydroxide.

2. The process according to claim 1, wherein the regenerated cellulose articles are fibres, films or tubing.

3. The process according to claim 1, wherein the amine N-oxide is N-methylmorpholine N-oxide.

4. The process according to preceding claim 1, wherein the spent bath contains 5 to 40 per cent by weight amine oxide.

5. The process according to claim 4, wherein the spent bath contains 15 to 35 per cent by weight amine oxide.

6. The process according to claim 1, wherein the anion-exchange resin is a quaternary ammonium resin containing —$CH_2N(CH_3)_3^+$ groups.

7. The process according to claim 1, wherein the anion-exchange resin is a macroporous resin.

8. The process according to claim 1, wherein the strong inorganic acid is selected from the group consisting of hydrochloric acid and sulphuric acid.

9. The process according to claim 1, wherein the solution used in treatment step (1) contains 1 to 10 percent by weight of the acid.

10. The process according to claim 9, wherein the solution used in treatment step (1) contains 2 to 7 percent by weight of the acid.

11. The process according to claim 1, wherein the solution used in treatment step (2) contains 1 to 10 per cent by weight sodium hydroxide.

12. The process according to claim 11, wherein the solution used in treatment step (2) contains 2 to 6 per cent by weight sodium hydroxide.

13. The process according to claim 1, wherein 1.0 to 1.1 mole sodium hydroxide is used in treatment step (2) for each equivalent of acid used in treatment step (1).

14. The process according to claim 1, wherein 1.0 to 5.0 bed volumes of aqueous solution are used in each of treatment steps (1) and (2).

15. The process according to claim 1, wherein the resin is washed during the regeneration cycle with water before treatment step (1), between treatment steps (1) and (2), and after treatment step (2).

16. The process according to claim 1, wherein the spent bath is additionally passed through a cation-exchange resin.

17. The process according to claim 16, wherein the spent bath is passed firstly through the anion-exchange resin and secondly through the cation-exchange resin.

18. The process according to claim 1, wherein the spent bath is filtered before passage through the anion-exchange resin.

* * * * *

UNITED STATES PATENT AND TRADEMARK OFFICE
CERTIFICATE OF CORRECTION

PATENT NO. : 5,441,689
DATED : August 15, 1995
INVENTOR(S) : Peter R. Laity

It is certified that error appears in the above-indentified patent and that said Letters Patent is hereby corrected as shown below:

Col. 2, line 62, delete "Amberlite" and replace with -- AMBERLITE --.

Col. 2, line 63, delete "Lewatit" and replace with -- LEWATIT --.

Col. 2, line 63, delete "LEWATT" and replace with -- LEWATIT --.

Col. 6, line 5, after "IRA-900", insert -- resin --.

Col. 6, line 46, before the word "soakings", insert -- 10 --.

Signed and Sealed this

Twenty-sixth Day of December, 1995

Attest:

BRUCE LEHMAN

Attesting Officer    Commissioner of Patents and Trademarks